(12) United States Patent
Aoki (10) Patent No.: US 9,303,543 B2
(45) Date of Patent: *Apr. 5, 2016

(54) HONEYCOMB CATALYST BODY

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 249 days.

This patent is subject to a terminal disclaimer.

(21) Appl. No.: 14/090,165

(22) Filed: Nov. 26, 2013

(65) Prior Publication Data

US 2014/0154146 A1 Jun. 5, 2014

(30) Foreign Application Priority Data

Dec. 3, 2012 (JP) .................................. 2012-264746

(51) Int. Cl.
*B01D 50/00* (2006.01)
*F01N 3/28* (2006.01)
(Continued)

(52) U.S. Cl.
CPC ............. *F01N 3/2828* (2013.01); *B01J 35/002* (2013.01); *B01J 35/0006* (2013.01); *B01J 35/04* (2013.01); *B01J 35/10* (2013.01); *B01J 35/1076* (2013.01); *B01J 37/0215* (2013.01); *C04B 38/0009* (2013.01)

(58) Field of Classification Search
CPC .................. C04B 38/0009; C04B 2111/0081; B01J 35/04; B01J 35/1076; B01J 35/006
USPC .................................................. 422/177, 180
See application file for complete search history.

(56) References Cited

U.S. PATENT DOCUMENTS 6,753,294 B1 * 6/2004 Brisley ............... B01D 53/9431
502/400
7,119,044 B2 * 10/2006 Wei .................... B01D 53/9431
252/373

(Continued)

FOREIGN PATENT DOCUMENTS

JP 2003-205245 A1 7/2003
JP 2003-307115 A1 10/2003

(Continued)

OTHER PUBLICATIONS

Extended European Search Report (Application No. 13195170.9) dated Apr. 14, 2014.

*Primary Examiner* — Tom P Duong
(74) *Attorney, Agent, or Firm* — Burr & Brown, PLLC (57) ABSTRACT

A honeycomb catalyst body having high mechanical strength, less pressure loss, and suitable purification performance is provided, and includes a plugged honeycomb structure having porous partition walls defining cells extending from one end face to another end face, inflow side plugged portions provided at one ends of the predetermined cells, outflow side plugged portions provided at another ends of the remaining cells, and porous projecting portions projecting so as to extend from the partition walls into the cells and being formed integrally with the partition walls; and a catalyst loaded onto the projecting portions of the plugged honeycomb structure, wherein porosities of the partition walls are 40% or more and smaller than 60%, thicknesses of the projecting portions are from 30 to 140% of thicknesses of the partition walls, and a catalyst amount loaded onto the partition walls thereof is smaller than a catalyst amount loaded onto the projecting portions.

11 Claims, 3 Drawing Sheets

(51) Int. Cl.
  *B01J 35/00* (2006.01)
  *B01J 35/04* (2006.01)
  *B01J 35/10* (2006.01)
  *B01J 37/02* (2006.01)
  *C04B 38/00* (2006.01)

(56) References Cited

U.S. PATENT DOCUMENTS

| | | | | |
|---|---|---|---|---|
| 8,470,255 B2* | 6/2013 | Mizutani | ................ | B01J 23/002 422/177 |
| 8,603,942 B2* | 12/2013 | Goto | .................. | B01D 46/2429 502/100 |
| 2004/0076565 A1* | 4/2004 | Gandhi | .............. | B01D 53/8631 423/235 |
| 2005/0031514 A1* | 2/2005 | Patchett | ................ | B01D 5/0054 423/239.2 |
| 2010/0061903 A1* | 3/2010 | Kohara | .............. | B01D 53/9468 423/213.2 |
| 2010/0175372 A1* | 7/2010 | Lambert | ............ | B01D 53/9472 60/297 |
| 2011/0179777 A1* | 7/2011 | Chandler | .............. | F01N 3/0222 60/297 |
| 2011/0201493 A1 | 8/2011 | Goto et al. | | |

FOREIGN PATENT DOCUMENTS

| | | |
|---|---|---|
| JP | 2005-220848 A1 | 8/2005 |
| JP | 2009-131780 A1 | 6/2009 |

* cited by examiner

HONEYCOMB CATALYST BODY

The present application is an application based on JP-2012-264746 filed on Dec. 3, 2012 with the Japanese Patent Office, the entire contents of which are incorporated herein by reference.

BACKGROUND OF THE INVENTION

1. Field of the Invention

The present invention relates to a honeycomb catalyst body. More particularly, it relates to a honeycomb catalyst body having high mechanical strength, less pressure loss, and suitable purification performance.

2. Background Art

There has been increasing a need to remove harmful substances or particulate matters in exhaust gases discharged from internal combustion engines such as an automobile engine, a construction machine engine and a stationary engine for industrial machine, the other burning devices and the like, in consideration of influences on the environment. Therefore, there has been used a honeycomb catalyst body loading a catalyst onto a plugged honeycomb structure to purify a particulate matter (hereinafter referred to as the "PM" sometimes) or the harmful substances (e.g., see Patent Document 1).

As the honeycomb catalyst body, for example, there is used the one loading a predetermined catalyst onto a plugged honeycomb structure. The plugged honeycomb structure includes porous partition walls defining a plurality of cells to become through channels of a fluid. Moreover, this plugged honeycomb structure is alternately arranged with predetermined cells (inflow cells) of which one end is open and another end is plugged and the remaining cells (outflow cells) of which one end is plugged and another end is open. Furthermore, when the honeycomb catalyst body is used, the fluid (an exhaust gas) flows in from one end of the honeycomb catalyst that the predetermined cells are open, passes through the partition walls, and then flows out on the remaining cells as the passed fluid. In this way, the passed fluid flows out from another end thereof that the remaining cells are open, and thereby the honeycomb catalyst body can collect and remove the PM in the exhaust gas and remove the harmful substances by the catalyst.

[Patent Document 1] JP-A-2009-131780

SUMMARY OF THE INVENTION

However, in a honeycomb catalyst body disclosed in Patent Document 1, there was a case that a mechanical strength cannot sufficiently be obtained. Therefore, the honeycomb catalyst body disclosed in Patent Document 1 might be broken when a load is applied thereto during canning.

The present invention has been developed in view of problems of such a conventional technology. An object thereof is to provide a honeycomb catalyst body having high mechanical strength, less pressure loss, and suitable purification performance.

According to the present invention, the following honeycomb catalyst body is provided.

[1] A honeycomb catalyst body including a plugged honeycomb structure having porous partition walls defining a plurality of cells extending from an inflow side end face to an outflow side end face to become through channels of a fluid, inflow side plugged portions provided at an outflow side end of the predetermined cells, outflow side plugged portions provided at an inflow side ends of the remaining cells, and porous projecting portions projecting so as to extend from the partition walls into the cells and being formed integrally with the partition walls; and a catalyst loaded onto the projecting portions of the plugged honeycomb structure, wherein a porosity of each of the partition walls of the plugged honeycomb structure is 40% or more and smaller than 60%, a thickness of each of the projecting portions is from 30 to 140% of a thickness of each of the partition walls, an amount of the catalyst loaded onto the partition walls in a cross section perpendicular to an extending direction of the cells is 40% or less of a total amount of the catalyst loaded onto the plugged honeycomb structure, and an amount of the catalyst to be loaded onto the partition walls is smaller than an amount of the catalyst to be loaded onto the projecting portions.

[2] The honeycomb catalyst body according to the above [1], wherein the amount of the catalyst loaded onto the partition walls of the plugged honeycomb structure is 5% or less of the total amount of the catalyst loaded onto the plugged honeycomb structure.

[3] The honeycomb catalyst body according to the above [1] or [2], wherein an average pore diameter of the partition walls of the plugged honeycomb structure is 25 or less.

[4] The honeycomb catalyst body according to any one of the above [1] to [3], wherein each of the projecting portions of the plugged honeycomb structure is in the form of a wall defining the cell to form a plurality of cells.

[5] The honeycomb catalyst body according to any one of the above [1] to [3], wherein each of the projecting portions of the plugged honeycomb structure is in the form of a protruding projecting from the surface of the partition wall.

[6] The honeycomb catalyst body according to any one of the above [1] to [5], wherein the projecting portions of the plugged honeycomb structure project so as to extend into inflow cells being the cells provided with the outflow side plugged portions and into outflow cells being the cells provided with the inflow side plugged portions, and the catalyst loaded onto the projecting portions extending into the inflow cells of the plugged honeycomb structure is of a type different from that of the catalyst loaded onto the projecting portions extending into the outflow cells of the plugged honeycomb structure.

[7] The honeycomb catalyst body according to any one of the above [1] to [6], wherein the thickness of each of the partition walls of the plugged honeycomb structure is from 64 to 508 w.

In a honeycomb catalyst body of the present invention, since a porosity of each of partition walls of a plugged honeycomb structure is 40% or more and smaller than 60%, the partition walls are comparatively dense to have high mechanical strength. Moreover, in the honeycomb catalyst body of the present invention, since a thickness of each of projecting portions is from 30 to 140% of a thickness of each of the partition walls, an initial pressure loss can be suppressed low while ensuring the strength of the honeycomb catalyst body. Furthermore, in the honeycomb catalyst body of the present invention, an amount of the catalyst loaded onto the partition walls in a cross section perpendicular to an extending direction of the cell is 40% or less of a total amount of the catalyst loaded onto the plugged honeycomb structure. Additionally, the amount of the catalyst to be loaded onto the partition walls is smaller than an amount of the catalyst to be loaded onto the projecting portions. Therefore, in the honeycomb catalyst body of the present invention, it is possible to suppress an increase of a pressure loss due to clogging or noticeably narrowing pores in the partition walls by loading a large amount of the catalyst onto the partition walls. Furthermore, in the honeycomb catalyst body of the present invention, the amount of the catalyst loaded onto the partition walls is reduced in order to prevent the increase of the pressure loss, but a larger amount of the catalyst is loaded onto the projecting portions than onto the partition walls to have a suitable purification performance.

DETAILED DESCRIPTION OF THE INVENTION

Hereinafter, embodiments of the present invention will be described. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Figure 1:
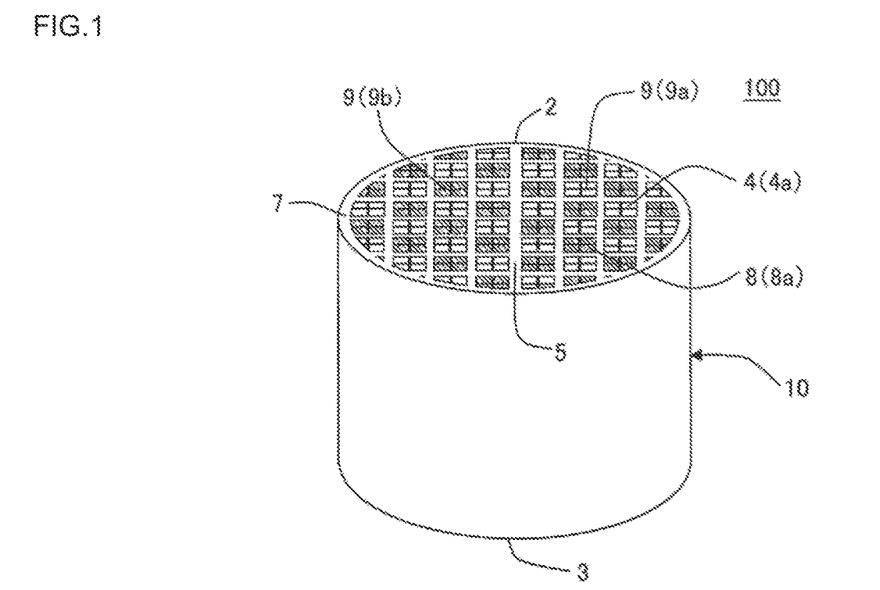
FIG. 1 is a perspective view schematically showing one embodiment of a honeycomb catalyst body of the present invention.
Figure 2:
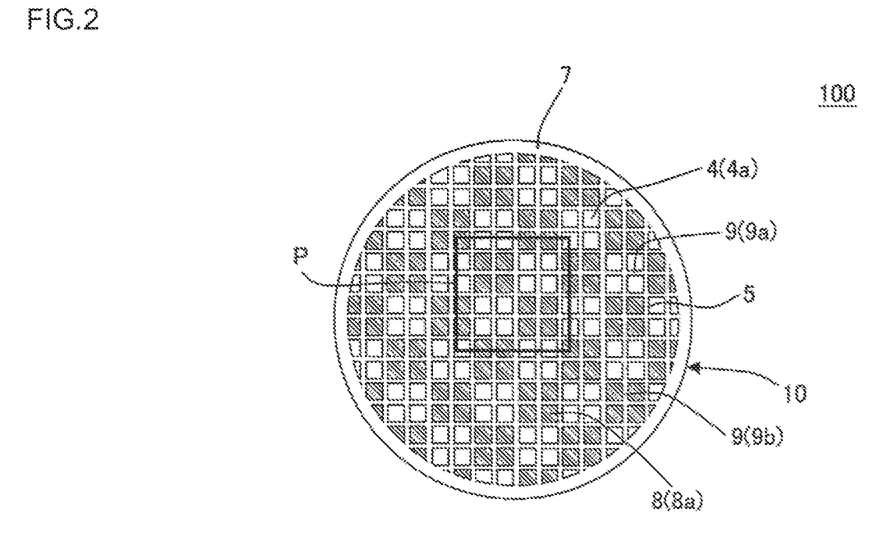
FIG. 2 is a plan view schematically showing one end face in the one embodiment of the honeycomb catalyst body of the present invention.
Figure 3:
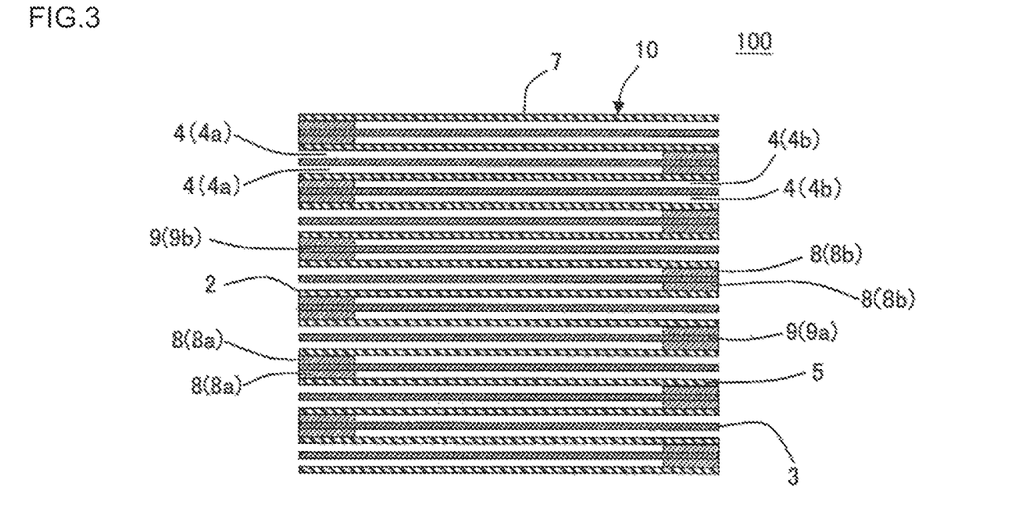
FIG. 3 is a cross sectional view schematically showing a cross section parallel to a cell extending direction in the one embodiment of the honeycomb catalyst body of the present invention.

[1] Honeycomb Catalyst Body:

An example of one embodiment of the honeycomb catalyst body of the present invention is a honeycomb catalyst body 100 shown in FIG. 1 to FIG. 3. The honeycomb catalyst body 100 includes a plugged honeycomb structure 10 having partition walls 5, inflow side plugged portions 8a, outflow side plugged portions 8b, and projecting portions 9; and a catalyst loaded onto the projecting portions 9 of the plugged honeycomb structure 10. The partition walls 5 are porous partition walls defining a plurality of cells 4 extending from an inflow side end face 2 to an outflow side end face 3 and to become through channels of a fluid. The inflow side plugged portions 8a are provided at ends (inflow side ends) of the predetermined cells in the inflow side end face 2. The outflow side plugged portions 8b are provided at ends (outflow side ends) of the remaining cells in the outflow side end face 3. The projecting portions 9 are porous portions projecting so as to extend from the partition walls 5 into the cells 4 and being formed integrally with the partition walls 5. In the honeycomb catalyst body 100, a porosity of each of the partition walls 5 of the plugged honeycomb structure 10 is 40% or more and smaller than 60%. In the honeycomb catalyst body 100, a thickness of each of the projecting portions 9 is from 30 to 140% of a thickness of each of the partition walls 5. In the honeycomb catalyst body 100, an amount of the catalyst loaded onto the partition walls 5 in a cross section perpendicular to an extending direction of the cells is 40% or less of a total amount of the catalyst to be loaded onto the honeycomb catalyst body 100. Moreover, an amount of the catalyst to be loaded onto the partition walls 5 is smaller than an amount of the catalyst to be loaded onto the projecting portions 9. In this way, in the honeycomb catalyst body 100, a large amount of the catalyst is positively loaded onto the projecting portions 9 as compared with the partition walls 5.

In the honeycomb catalyst body 100, plugged portions 8 (the inflow side plugged portions 8a and the outflow side plugged portions 8b) are alternately arranged with the predetermined cells and the remaining cells, so as to form a so-called checkered pattern. The plugged honeycomb structure 10 further has a peripheral wall 7 disposed in an outer periphery. It is to be noted that the honeycomb catalyst body of the present invention does not necessarily have to have the peripheral wall 7.

In such a honeycomb catalyst body 100, since the porosity of each of the partition walls 5 of the plugged honeycomb structure 10 is 40% or more and smaller than 60%, the partition walls 5 are comparatively dense to have a high mechanical strength. Moreover, in the honeycomb catalyst body 100, since the thickness of the projecting portion 9 is from 30 to 140% of the thickness of the partition wall 5, an initial pressure loss can be suppressed low while ensuring the strength of the honeycomb catalyst body 100. Furthermore, in the honeycomb catalyst body 100, the amount of the catalyst loaded onto the partition walls 5 in the cross section perpendicular to the extending direction of the cell is 40% or less of the total amount of the catalyst to be loaded onto the honeycomb catalyst body 100. Additionally, the amount of the catalyst to be loaded onto the partition walls 5 is smaller than the amount of the catalyst to be loaded onto the projecting portions 9. Accordingly, in the honeycomb catalyst body 100, the increase of a pressure loss is less caused by applying (loading) the catalyst thereto. Furthermore, in the honeycomb catalyst body 100, since the catalyst is loaded onto the projecting portions 9, a purification performance is suitable.

Here, when the catalyst is loaded onto a filter structure (the plugged honeycomb structure) capable of collecting particulate matters, there have heretofore been employed measures to apply the catalyst to pores in the partition walls of the filter structure and load the catalyst thereonto. However, in such a method, when the amount of the catalyst is increased for the purpose of enhancing the purification performance of the honeycomb catalyst body to be obtained, the pores in the partition walls are clogged by the catalyst, or the pores are noticeably narrowed, so that the porosity of each partition wall rapidly deteriorates. Therefore, there has been the problem that the pressure loss of the filter (the honeycomb catalyst body) excessively increases. Therefore, when the amount of the catalyst is increased, there are employed measures to increase the porosity of each of the partition walls of the filter and to ensure a space where the catalyst is loaded so that the pressure loss does not increase even when a large amount of the catalyst is loaded. However, when the porosity of each partition wall is increased, the mechanical strength of the filter deteriorates. Consequently, there has been a limit to the measures to increase the porosity of each of the partition walls in consideration of an actual use. Furthermore, in a flow speed of the fluid (the exhaust gas) passing through the partition walls of the filter, there appears a distribution in a through channel direction. Therefore, the catalyst loaded onto a portion through which a large amount of the exhaust gas flows deteriorates quickly. Moreover, the flow speed distribution of the exhaust gas does not change when use conditions are the same, and hence it is difficult situation to effectively utilize the other portion (a portion other than the portion through which the large amount of the exhaust gas flows).

And so, the honeycomb catalyst body of the present invention is divided into a portion onto which the large amount of the catalyst is loaded to mainly assume a catalyst function and a portion which collects the particulate matters mainly as a filter (the portions are disposed in separate regions). According to such a constitution, it is possible to avoid the excessive increase of the pressure loss caused by loading the catalyst onto pore surfaces of the partition walls or to avoid the deterioration of the mechanical strength of the filter (the honeycomb catalyst body) caused by increasing the porosity for the purpose of suppressing this increase. Moreover, since a catalyst reaction is performed in the through channel direction in the same manner as in a conventional honeycomb catalyst body, selective deterioration of part of the catalyst hardly occurs or the deterioration occurs in order from an exhaust gas inflow port side (from the catalyst loaded onto an inflow cell side projecting portion described later) even when the catalyst deteriorates. Consequently, in the honeycomb catalyst body of the present invention, the catalyst on an exhaust gas outflow port side (the catalyst loaded onto an outflow cell side projecting portion described later) may exert a purifying function, even when the catalyst loaded onto the inflow cell side projecting portions deteriorates.

FIG. 1 is a perspective view schematically showing one embodiment of the honeycomb catalyst body of the present invention. FIG. 2 is a plan view schematically showing one end face in the one embodiment of the honeycomb catalyst body of the present invention. FIG. 3 is a cross sectional view schematically showing a cross section parallel to an extending direction of the cell in the one embodiment of the honeycomb catalyst body of the present invention.

[1-1] Plugged Honeycomb Structure:

The porosity of the partition wall 5 is 40% or more and smaller than 60%, preferably from 40 to 58%, and further preferably from 40 to 56%. When the porosity of the partition wall 5 is within the above range, the increase of the pressure loss can be suppressed while ensuring a canning strength. When the porosity of the partition wall 5 is smaller than 40%, a resistance increases when the exhaust gas passes through the partition wall 5, and thereby the pressure loss increases. When the porosity is 60% or more, the strength of the partition wall 5 deteriorates, and thereby it might be broken at the canning.

The porosity of the partition wall 5 is a value measured by image analysis. Specifically, a plurality of view fields of the partition walls of the plugged honeycomb structure in the cross section perpendicular to the extending direction of the cell are arbitrarily photographed by a scanning type electron microscope (SEM). Next, each photographed image is binarized by the image analysis to divide into a cavity portion (i.e., a pore portion) and a portion other than the cavity. Next, a ratio of an area corresponding to the cavity portion in each image is calculated, and an average value is obtained. In this way, the porosity of each of the partition walls is calculated.

An average pore diameter of the partition walls 5 is preferably 25 µm or less, further preferably from 7 to 25 µm, especially preferably from 8 to 24 µm, and most preferably from 9 to 23 µm. When the above average pore diameter is within the above range, the increase of the pressure loss can be suppressed while ensuring the function as the filter (a particulate matter collecting performance). When the average pore diameter of the partition walls 5 is smaller than 7 µm, the passing resistance increases when the exhaust gas passes through the partition walls 5, and thereby the pressure loss might increase. When it is in excess of 25 µm, the collecting performance of ash and the particulate matters might deteriorate. The average pore diameter of the partition walls 5 is a value measured by the image analysis in the same manner as in the porosity of each of the partition walls.

A thickness of the partition wall 5 is preferably from 64 to 508 µm, further preferably from 89 to 381 µm, and especially preferably from 110 to 305 µm. When the thickness of each partition wall is within the above range, there are the advantages that the strength of the honeycomb structure is maintained and that the increase of the pressure loss is suppressed. When the thickness of the partition wall 5 is smaller than 64 µm, the strength of the honeycomb structure may deteriorate. When it is in excess of 508 µm, there might cause a failure that the pressure loss becomes high. The thickness of the partition wall 5 is a value measured by a method of observing the cross section perpendicular to a central axis of the honeycomb catalyst body 100 by a microscope.

A value (L/D) calculated by a formula: (a length L of the honeycomb catalyst body in a central axis direction/a diameter D of the end face of the honeycomb catalyst body) is preferably from 0.5 to 2, further preferably from 0.6 to 1.7, and especially preferably from 0.7 to 1.6. When the above value (L/D) is within the above range, ring cracks can be suppressed.

A shape of the cell 4 is a quadrangular shape in a cross section perpendicular to the extending direction of the cell. There is not any restriction on the shape of the cell 4, and examples of the shape include polygonal shapes such as a triangular shape and an octagonal shape, a round shape, and an oval shape in addition to the quadrangular shape.

There is not any restriction on a thickness of the peripheral wall 7. The thickness of the peripheral wall 7 is preferably from 0.1 to 8 mm, further preferably from 0.2 to 7 mm, and especially preferably from 0.3 to 6 mm. When the thickness of the peripheral wall 7 is within the above range, a heat stress generated by a difference in heat capacity between the peripheral wall 7 and the partition wall 5 can be further reduced while ensuring the strength of the peripheral wall 7.

There is not any restriction on a shape of the plugged honeycomb structure 10 (the honeycomb catalyst body 100). The shape is preferably a cylindrical shape, a tubular shape with an oval bottom face, a tubular shape with a bottom face having a polygonal shape such as a quadrangular shape, a pentangular shape or a hexagonal shape, or the like, and especially preferably a cylindrical shape. Moreover, there is not any restriction on a size of the plugged honeycomb structure 10 (the honeycomb catalyst body 100). A length thereof in the extending direction of the cell is preferably from 50 to 381 mm. Moreover, when an outer shape of the plugged honeycomb structure 10 (the honeycomb catalyst body 100) is, for example, a cylindrical shape, a diameter of a bottom face thereof is preferably from 50 to 381 mm.

Each of the partition walls 5 and the peripheral wall 7 preferably contains a ceramic material as a main component. A material of each of the partition walls 5 and the peripheral wall 7 is, for example, preferably at least one selected from the following group. That is, the material is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When the material is cordierite, it is possible to obtain the plugged honeycomb structure having less thermal expansion coefficient and excellent heat shock resistance. The material of the partition walls 5 is preferably the same as that of the peripheral wall 7. It is to be noted that the material of the partition walls 5 may be different from that of the peripheral wall 7. When it is referred to "the ceramic material as the main component", it is meant that a content of the ceramic material is 90 mass % or more of the whole material.

The projecting portions 9 are the porous portions projecting so as to extend from the partition walls 5 into the cells 4 and being formed integrally with the partition walls 5. Each of the projecting portions may project so as to extend into at least one of the inflow cell being the cell provided with the outflow side plugged portion and the outflow cell being the cell provided with the inflow side plugged portion. The projecting portions preferably project so as to extend into both the inflow cell and the outflow cell. Moreover, a shape of the projecting portion extending into the inflow cell may be the same as that of the projecting portion extending into the outflow cell, or may be different therefrom. That is, the projecting portion extending into the inflow cell may be a partition wall defining a small cell described later, and the projecting portion extending into the outflow cell may be in the form of a protrusion.

Figure 4:
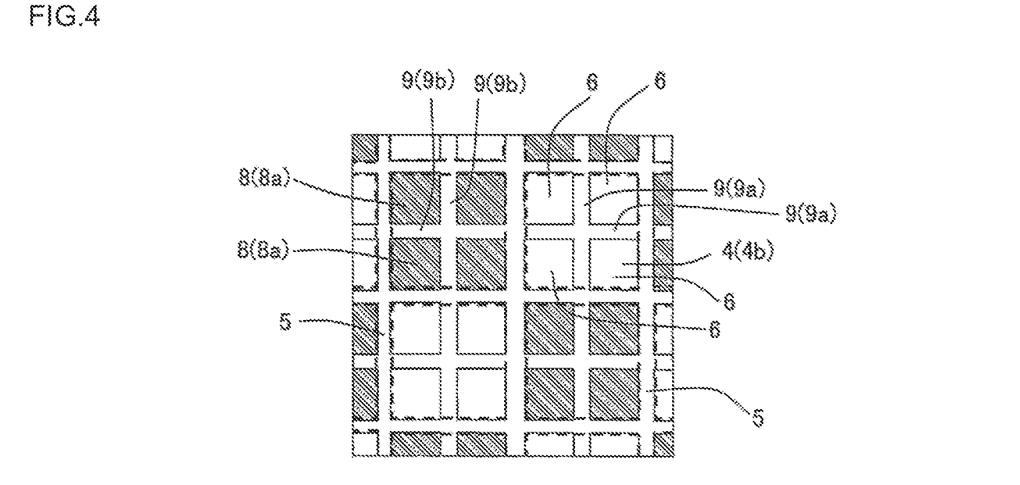
FIG. 4 is a plan view schematically showing an enlarged part of the one end face in the one embodiment of the honeycomb catalyst body of the present invention.

The projecting portion 9 is preferably in the form of a wall defining the cell 4 to form a plurality of cells (small cells 6 (see FIG. 4) as in the honeycomb catalyst body 100 shown in FIG. 1 to FIG. 4. In the honeycomb catalyst body 100, since the projecting portions 9 have the above constitution, the strength of the honeycomb structure can be enhanced, and the honeycomb catalyst body can be manufactured without changing conventional manufacturing steps and jigs. FIG. 4 is a plan view schematically showing an enlarged region P of part of the one end face in the one embodiment of the honeycomb catalyst body of the present invention. Each portion surrounded with a broken line shown in FIG. 4 shows the cell 4 defined by the partition walls 5. Each of the projecting portions 9 projects so as to extend from the partition wall 5 into the cell 4. FIG. 4 shows an example where each of the cells 4 is defined by partition walls constituted of the projecting portions 9 to form the four small cells 6. In the honeycomb catalyst body 100 of the one embodiment of the honeycomb catalyst body of the present invention, the catalyst is not substantially loaded onto pore surfaces of the partition walls 5 defining the cells 4, and the catalyst is loaded onto the surfaces of the partition walls (the projecting portions 9) defining the small cells 6 and onto the pore surfaces. The wall-like projecting portions 9 extend from one end face to another end face of the honeycomb catalyst body 100, and further define "the cell 4 defined by the partition walls 5" to form the small cells 6 each having a smaller open area than the cell 4.

Figure 5:
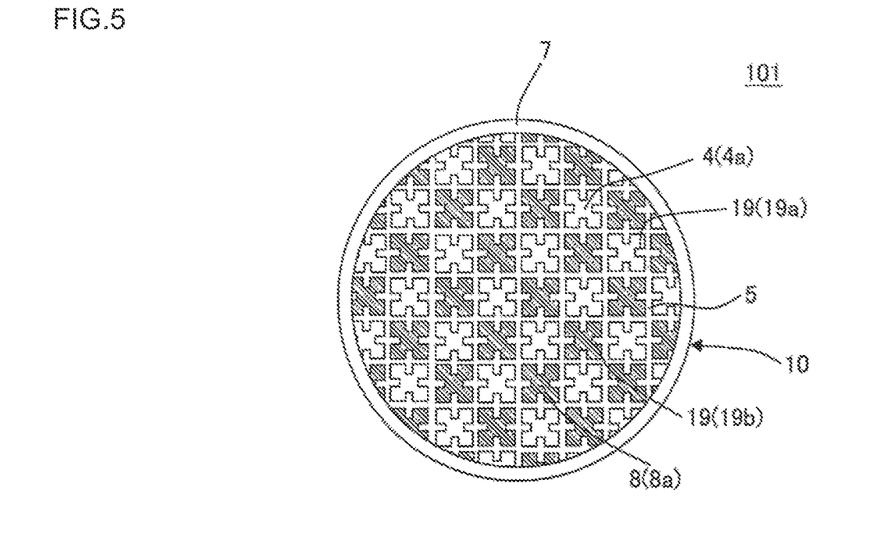
FIG. 5 is a plan view schematically showing one end face in another embodiment of the honeycomb catalyst body of the present invention.

Moreover, each projecting portion is preferably in the form of a protrusion (a protrusion-like projecting portion 19 (19a or 19b)) projecting from the surface of a partition wall 5 as in a honeycomb catalyst body 101 shown in FIG. 5. In this way, the projecting portion is in the form of the protrusion, and thereby the initial pressure loss can be reduced. The protrusion-like projecting portion 19a is the projecting portion extending into an inflow cell 4a of a plugged honeycomb structure 10, and a protrusion-like projecting portion 19b is the projecting portion extending into an outflow cell 4b of the plugged honeycomb structure 10.

There is not any restriction on the number, a size, and the like of the protrusion-like projecting portions 19. For example, the honeycomb catalyst body 101 shown in FIG. 5 is an example where the one protrusion-like projecting portion 19 extends from each partition wall, and the four protrusion-like projecting portions 19 extend into one cell 4. According to such a constitution, it can be manufactured by a simple change of a jig used in the conventional manufacturing steps.

A thickness of each projecting portion is from 30 to 140%, preferably from 30 to 130%, and further preferably from 30 to 120% of a thickness of each partition wall. When the thickness of the projecting portion is within the above range, the initial pressure loss can be suppressed while ensuring the strength of the honeycomb catalyst body. When the thickness of the projecting portion is smaller than 30%, the strength of the honeycomb catalyst body deteriorates, and thereby the honeycomb catalyst body may be broken at canning. When it is in excess of 140%, the initial pressure loss may increase. It is to be noted that the thickness of the projecting portion means a thickness of the thickest portion of a partition wall in the case that the projecting portion is in the form of the wall defining the cell to form a plurality of cells. Moreover, in the case that the projecting portion is in the form of the protrusion, the thickness of the projecting portion means a maximum width of the above projecting portion in a cross section perpendicular to an extending direction of the cell.

It is to be noted that the thickness of the projecting portion extending into the inflow cell of the plugged honeycomb structure (an inflow cell side projecting portion) may be different from the thickness of the projecting portion extending into the outflow cell of the plugged honeycomb structure (an outflow cell side projecting portion). Moreover, the thickness of the inflow cell side projecting portion may be the same as that of the outflow cell side projecting portion.

The porosity and an average pore diameter of each projecting portions can be employed the same ranges as the abovementioned porosity and average pore diameter of each partition walls, and preferably the same as the porosity and average pore diameter of the partition walls.

An example of a material of the plugged portions (the inflow side plugged portions and the outflow side plugged portions) is the same as that of the partition walls 5, and the material is preferably the same material as in the partition walls 5.

A cell density of the plugged honeycomb structure 10 is calculated as follows in the case that each of the projecting portions is in the form of a protrusion. That is, in the cross section perpendicular to the extending direction of the cell, a line segment connecting start points of the opposed protrusion-like projecting portions to each other is assumed (when a plurality of line segments can be drawn, the longest line segment is employed), and a virtual partition wall is considered to be present at a position of this line segment, to calculate the cell density. It is to be noted that when each projecting portion is in the form of the wall, a small cell is regarded as one cell, to calculate the cell density. For example, in the honeycomb catalyst body 101 shown in FIG. 5, there are assumed two line segments each connecting start points of the opposed projecting portions 19 to each other, among the four protrusion-like projecting portions 19 extending into the one cell 4.

The cell density of the plugged honeycomb structure 10 is preferably from 15.5 to 93 cells/cm$^2$, further preferably from 31 to 77.5 cells/cm$^2$, and especially preferably from 46.5 to 62 cells/cm$^2$. When the above cell density is within the above range, there is the advantage that the increase of the pressure loss is suppressed while ensuring the strength of the honeycomb structure. When the cell density of the plugged honeycomb structure 10 is smaller than 15.5 cells/cm$^2$, the strength of the plugged honeycomb structure 10 deteriorates, and thereby the plugged honeycomb structure might be broken at canning. When it is in excess of 93 cells/cm$^2$, the pressure loss increases, and thereby it might cause the failure that fuel consumption deteriorates.

[1-2] Catalyst:

The amount of the catalyst loaded onto the partition walls 5 in the cross section perpendicular to the extending direction of the cells 4 of the plugged honeycomb structure 10 is 40% or less of the total amount of the catalyst loaded onto the plugged honeycomb structure 10. In this way, in the honeycomb catalyst body 100, a larger amount of the catalyst is loaded onto the projecting portions 9 than onto the partition wall 5. The amount of the catalyst to be applied to the partition walls 5 is 40% or less, preferably 30% or less, and further preferably 20% or less of the total amount of the catalyst to be applied to the honeycomb structure 10. When the amount of the catalyst to be applied to the partition walls 5 is in excess of 40% of the total amount of the catalyst to be applied to the honeycomb structure 10, the pressure loss increases in a case where suitable purification efficiency is maintained. Moreover, a performance of the plugged honeycomb structure 10 (a pressure loss increase prevention effect) is the best in a state where a catalyst coat is not substantially present on the partition walls 5 (a catalyst is not substantially loaded onto the partition walls 5). That is, in a state where the catalyst coat is not substantially present on the partition walls 5, through channels of the exhaust gas passing through the partition walls are sufficiently ensured, and hence the increase of the pressure loss can be prevented. In this case, "a state where the catalyst coat is not substantially present on the partition walls" means a case where the amount of the catalyst applied to (loaded onto) the partition walls 5 is 5% or less of the total amount of the catalyst applied to (loaded onto) the plugged honeycomb structure 10 (including a case where the catalyst is not loaded onto the partition walls 5).

The amount of the catalyst loaded onto the partition walls and the projecting portions (the catalyst amount) is measured by the image analysis in the same manner as in a measuring method of the porosity. That is, "the amount of the catalyst" is a size of an area of the catalyst calculated by the image analysis. Specifically, firstly, in an arbitrary cross section perpendicular to a central axis (the extending direction of the cell) of the honeycomb catalyst body, the image analysis is performed to binarize substrate portions corresponding to the partition walls and the projecting portions and a portion corresponding to the catalyst. Next, an area of the catalyst loaded onto the projecting portions and an area of the catalyst loaded onto the partition walls are calculated as the catalyst amounts in the respective portions.

In this way, in the honeycomb catalyst body of the present invention, there exist the portions having less catalyst loading amount and functioning as filters to collect particulate matters (the partition walls) and the portions being positively loaded a large amount of the catalyst thereonto and purifying harmful substances in the exhaust gas (the projecting portions) in separate regions, respectively. Therefore, for the partition walls functioning as the filters, it is not necessary to consider that a large amount of the catalyst is loaded as in the conventional honeycomb catalyst body, and thereby the porosity can be small. As a result, the mechanical strength of the honeycomb catalyst body can be enhanced. Moreover, it is possible to avoid the increase of the pressure loss caused by loading the catalyst onto the insides of the partition walls (the pore surfaces of the partition walls).

As the catalyst, for example, a selective $NO_x$ reduction catalyst, an ammonia slip preventing catalyst, a ternary catalyst, a NOx adsorber catalyst or the like can be used.

The catalyst loaded onto inflow cell side projecting portions 9a is preferably of a type different from that of the catalyst loaded onto outflow cell side projecting portions 9b. In this case, examples of a combination of the catalyst to be loaded onto the inflow cell side projecting portions 9a and the catalyst to be loaded onto the outflow cell side projecting portions 9b (the catalyst of the inflow cell side projecting portions 9a:the catalyst of the outflow cell side projecting portions 9b) include a selective $NO_x$ reduction catalyst:an ammonia slip preventing catalyst, a ternary catalyst:a selective NO, reduction catalyst, and a $NO_x$ adsorber catalyst:the selective $NO_x$ reduction catalyst.

[2] Manufacturing Method of Honeycomb Catalyst Body of the Present Invention:

The honeycomb catalyst body of the present invention can be manufactured as follows. That is, a kneaded material obtained by kneading a forming raw material containing a ceramic raw material is extruded into a honeycomb shape to prepare a honeycomb formed body (a honeycomb formed body preparing step). Next, a plugging material is filled into open frontal areas of cells of the prepared honeycomb formed body to prepare a plugged honeycomb formed body (a plugging step). Next, the prepared plugged honeycomb formed body is fired, to prepare a plugged honeycomb structure in which porous plugged portions are provided at one end of each of the predetermined cells and at another end of each of the remaining cells (a plugged honeycomb structure preparing step). Next, the catalyst is loaded onto the prepared plugged honeycomb structure to prepare the honeycomb catalyst body (a catalyst loading step).

According to such a manufacturing method of honeycomb catalyst body, the honeycomb catalyst body of the present invention can suitably be manufactured.

[2-1] Honeycomb Formed Body Preparing Step:

In the present step, the kneaded material obtained by kneading the forming raw material is extruded into the honeycomb shape to obtain the honeycomb formed body. The open frontal areas of the predetermined cells in one end face of the obtained honeycomb formed body are plugged, and then fired. In this way, the plugged honeycomb structure can be prepared.

The forming raw material is preferably a ceramic raw material to which a dispersion medium and an additive have been added. Examples of the additive include an organic binder, a pore former, and a surfactant. An example of the dispersion medium is water.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material having less thermal expansion coefficient and excellent heat shock resistance is preferable.

Examples of the organic binder include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the organic binder is preferably from 0.2 to 2 parts by mass to 100 parts by mass of the ceramic raw material.

There is not any restriction on the pore former, as long as the pores are formed after the firing. Examples of the pore former include starch, resin balloons, a water-absorbing resin, silica gel and cokes. A content of the pore former is preferably from 5 to 15 parts by mass to 100 parts by mass of the ceramic raw material.

As the surfactant, ethylene glycol, dextrin, fatty acid soap, polyalcohol or the like can be used. These surfactants may be used alone, or a combination of two or more. A content of the surfactant is preferably from 0.1 to 2 parts by mass to 100 parts by mass of the ceramic raw material.

A content of the dispersion medium is preferably from 10 to 30 parts by mass to 100 parts by mass of the ceramic raw material.

A porous substrate having a desirable porosity and average pore diameter can be obtained by adjusting the particle diameters and an amount of the ceramic raw material (aggregate particles) to be used, and particle diameters and an amount of the pore former to be added.

There is not any restriction on a method of kneading the forming raw material to form the kneaded material. An example of the method is a method using a kneader, a vacuum clay kneader or the like. The extrusion can be performed by using a die having a desirable cell shape, partition wall thickness and cell density. A material of the die is preferably a cemented carbide which hardly wear away.

[2-2] Plugging Step:

In the present step, the plugging material is filled into the open frontal areas of the cells of the prepared honeycomb formed body to prepare the plugged honeycomb formed body.

As "the forming raw material containing the ceramic raw material" included in the plugging material, it is possible to use the same as "the forming raw material containing the ceramic raw material" being the raw material of the kneaded material to form the honeycomb formed body.

As a method of filling the plugging material into the open frontal areas of the cells, a heretofore known method can suitably be employed. For example, firstly, a mask is attached to one end face of the honeycomb formed body. Next, holes are made in portions of the mask covering the predetermined cells, by known means such as laser. Next, the above plugging material is filled into one end of each predetermined cell of the honeycomb formed body at which the holes are made in the mask. Next, a mask is attached to another end face of the honeycomb formed body. Next, holes are made in portions of the mask covering the remaining cells, by known means such as the laser. Next, the above plugging material is filled into another end of each remaining cell of the honeycomb formed body at which the holes are made in the mask. It is to be noted that the cordierite forming raw material is obtained by blending respective components so as to obtain a theoretical composition of cordierite crystals. The above cordierite forming raw material is specifically obtained by blending a silica source component, a magnesia source component, an alumina source component and the like.

[2-3] Plugged Honeycomb Structure Preparing Step:

A firing temperature can suitably be determined in accordance with the material of the honeycomb formed body. When the material of the honeycomb formed body is, for example, cordierite, the firing temperature is preferably from 1380 to 1450° C., and further preferably from 1400 to 1440° C. Moreover, a firing time is preferably from about three to ten hours.

The honeycomb formed body may be dried prior to the firing. There is not any restriction on a drying method. Examples of the drying method include hot air drying, microwave drying, dielectric drying, reduced pressure drying, vacuum drying, and freeze drying. Above all, the dielectric drying, the microwave drying, the hot air drying is preferably performed alone or any combination thereof. Moreover, drying conditions are preferably a drying temperature of 30 to 150° C. and a drying time of one minute to two hours.

It is to be noted that the honeycomb formed body may be fired to obtain a honeycomb fired body, and then the plugging material may be filled into ends of predetermined cells of the honeycomb fired body on one end face side.

[2-4] Catalyst Loading Step:

Next, the plugged honeycomb structure is immersed into a catalyst slurry containing the catalyst in order from one end side of the plugged honeycomb structure, and simultaneously, air is supplied into the above plugged honeycomb structure from another end face side of the plugged honeycomb structure. In this way, a catalyst coating layer made of the above catalyst slurry is formed on the surfaces of the inflow cells, the surfaces of the projecting portions projecting into the inflow cells and the surfaces of the pores of the projecting portions. Afterward, the air is sprayed into the cells of the plugged honeycomb structure from the above another end face side, to blow away the catalyst slurry which has penetrated into the pores of the partition walls.

Next, the plugged honeycomb structure is immersed into the catalyst slurry containing the catalyst in order from another end side of the plugged honeycomb structure, and simultaneously, air is supplied into the above plugged honeycomb structure from the one end face side of the plugged honeycomb structure. In this way, the catalyst coating layer made of the above catalyst slurry is formed on the surfaces of the outflow cells, the surfaces of the projecting portions projecting into the outflow cells and the surfaces of the pores of the projecting portions.

Afterward, the catalyst coating layer formed on this plugged honeycomb structure is dried and fired, to manufacture the honeycomb catalyst body.

Moreover, the catalyst may be loaded as follows. That is, firstly, the plugged honeycomb structure is immersed into provisional filling slurry containing a compound volatilized by applying heat thereto, prior to the application of the catalyst slurry. In this way, the above provisional filling slurry is filled into the pores of the partition walls of the plugged honeycomb structure.

Next, the catalyst slurry is filled into the inflow cells and the outflow cells from one end face and another end face of the plugged honeycomb structure, respectively. In this way, the catalyst coating layer made of the above catalyst slurry is formed on the surfaces of the inflow cells and the outflow cells, the surfaces of the projecting portions projecting into these inflow cells and outflow cells and the surfaces of the pores of the projecting portions.

Next, the plugged honeycomb structure is dried and fired, to volatilize the above provisional filling slurry filled into the pores of the partition walls. In this way, the honeycomb catalyst body can also be prepared.

EXAMPLES

Hereinafter, the present invention will specifically be described based on examples, but the present invention is not limited to these examples.

Example 1

As cordierite forming raw materials, alumina, aluminum hydroxide, kaolin, talc and silica were used. To 100 parts by mass of this cordierite forming raw material, 10 parts by mass of a pore former, 20 parts by mass of a dispersion medium, 1 part by mass of an organic binder and 0.5 part by mass of a dispersant were added, respectively, and the resultant was mixed and kneaded to prepare a kneaded material. As the dispersion medium, water was used, and as the pore former, cokes having an average particle diameter of 20 µm were used. As the organic binder, hydroxypropyl methylcellulose was used, and as the dispersant, ethylene glycol was used.

Next, the kneaded material was extruded by using a predetermined die, to prepare a honeycomb formed body having partition walls defining a plurality of cells extending through the honeycomb formed body from one end face to another end face, and projecting portions projecting so as to extend from the partition walls into cells and being formed integrally with the partition walls. The projecting portions were partition walls further forming four cells (small cells) by defining each cell defined by the partition walls. In the honeycomb formed body, a cell shape in a cross section perpendicular to an extending direction of the cell was a quadrangular shape, and the whole shape was a columnar. Next, the prepared honeycomb formed body was dried by a microwave drier, and then further completely dried by a hot air drier to obtain a dried honeycomb formed body (the honeycomb dried body). Afterward, both ends of the honeycomb dried body were cut to obtain a predetermined dimension. Next, a mask was attached to one end face of the honeycomb dried body. At this time, all open frontal areas of the cells were covered with the mask. Next, laser was irradiated thereto, to make holes in predetermined portions of the mask (i.e., portions covering the predetermined cells).

Next, an end of this honeycomb dried body to which the mask was attached (one end) was immersed into plugging slurry, to fill the above plugging material slurry into the one end of each predetermined cell. The plugging material slurry made of the same raw material as the above kneaded material was used.

Next, a mask was attached to another end face of the honeycomb dried body. At this time, all open frontal areas of the cells were covered with the mask. Next, laser was irradiated thereto, to make holes in predetermined portions of the mask (i.e., portions covering the remaining cells).

Next, an end of this honeycomb dried body to which the mask was attached (the other end) was immersed into the plugging slurry, to fill the above plugging material slurry into another end of each remaining cell.

Next, the honeycomb dried body into which the above plugging material slurry was filled was dried by a hot air drier. Afterward, the resultant was fired at 1410 to 1440° C. for five hours. In this way, the plugged honeycomb structure was prepared.

The obtained plugged honeycomb structure had a diameter of 143.8 mm, and a length of 152.4 mm in a central axis direction. A value (L/D) of the ratio of a length L in the central axis direction to a diameter D of the plugged honeycomb structure was 1.06. A cell density of the plugged honeycomb structure was 46.5 cells/cm². A thickness of each partition wall was 0.305 mm. A porosity of the partition wall was 58%. An average pore diameter of the partition walls was 20 μm. A thickness of each projecting portion was the same as the thickness of the partition wall (0.305 mm). A porosity of each projecting portion was 58%. An average pore diameter of the projecting portions was 20 μm. The results are shown in Table 1.

Next, a catalyst was loaded onto the obtained plugged honeycomb structure. Specifically, the plugged honeycomb structure was immersed into the catalyst slurry in order from one end of the plugged honeycomb structure, and simultaneously, air was supplied into the above plugged honeycomb structure from another end face side of the plugged honeycomb structure. Afterward, air was sprayed into the cells from another end face side of the plugged honeycomb structure, thereby blowing away the catalyst penetrating into the partition walls.

Next, the plugged honeycomb structure was immersed into the above catalyst slurry in order from another end of the plugged honeycomb structure, and simultaneously, air was supplied into the above plugged honeycomb structure from the one end face side of the plugged honeycomb structure. Afterward, air was sprayed into the cells from the one end face side of the plugged honeycomb structure, thereby blowing away the catalyst penetrating into the partition walls.

In this way, a catalyst coating layer was formed on the surfaces of projecting portions projecting into inflow cells and projecting portions projecting into outflow cells and the surfaces of pores. Afterward, the catalyst coating layer of the plugged honeycomb structure was dried and fired to obtain a honeycomb catalyst body.

In the obtained honeycomb catalyst body, a total amount of the catalyst loaded onto pore surfaces of partition walls in a cross section perpendicular to an extending direction of the cell was 5% or less of the total amount of the catalyst loaded onto a honeycomb structure (described as "a partition wall coat ratio (%)" in Table 1). Additionally, "(uniform)" in the "partition wall coat ratio (%)" column means that the amount of the catalyst loaded onto the honeycomb catalyst body is the same as the amount of the catalyst loaded onto the partition walls (a partition wall coat ratio of 100%).

[Porosity]:

Porosities of each of the partition walls and the projecting portions were calculated by a following method. Firstly, a plurality of view fields (three portions) of the partition walls of the plugged honeycomb structure in the cross section perpendicular to the extending direction of the cell were arbitrarily photographed by a scanning type electron microscope (SEM). Next, each photographed image was binarized by image analysis, and the image was divided into a cavity portion (i.e., a pore portion) and a portion other than the cavity. Next, a ratio of an area corresponding to the cavity portion in each image was calculated, and an average value was obtained. In this way, the porosities of each of the partition walls and the projecting portions were calculated.

[Average Pore Diameter]:

An average pore diameter of the partition walls was a value measured by the image analysis in the same manner as in the porosity of each partition wall.

TABLE 1

| | Structure | Length (mm) | Dia. (mm) | Partition wall thickness (mm) | Partition wall porosity (%) | Partition wall ave. pore dia (μm) | Cell density (cells/cm²) | Projecting portion thickness | Projecting portion porosity (%) | Projecting portion ave. pore dia. (μm) | Partition wall coat ratio (%) |
|---|---|---|---|---|---|---|---|---|---|---|---|
| Comp. Ex. 1 | Usual | 152.4 | 143.8 | 0.305 | 65 | 20 | 46.5 (usual cell density) | — | — | — | (uniform) |
| Comp. Ex. 2 | Usual | 152.4 | 143.8 | 0.305 | 48 | 12 | 46.5 (usual cell density) | — | — | — | (uniform) |
| Comp. Ex. 3 | Hybrid wall | 152.4 | 143.8 | 0.305 | 65 | 20 | 46.5 | The same as the partition wall | 65 | 20 | 5 |
| Ex. 1 | Hybrid wall | 152.4 | 143.8 | 0.305 | 58 | 20 | 46.5 | The same as the partition wall | 58 | 20 | 5 |

TABLE 1-continued

| | Structure | Length (mm) | Dia. (mm) | Partition wall thickness (mm) | Partition wall porosity (%) | Partition wall ave. pore dia (μm) | Cell density (cells/cm²) | Projecting portion thickness | Projecting portion porosity (%) | Projecting portion ave. pore dia. (μm) | Partition wall coat ratio (%) |
|---|---|---|---|---|---|---|---|---|---|---|---|
| Ex. 2 | Hybrid wall | 152.4 | 143.8 | 0.305 | 48 | 12 | 46.5 | The same as the partition wall | 48 | 12 | 5 |
| Ex. 3 | Hybrid wall | 152.4 | 143.8 | 0.305 | 40 | 12 | 46.5 | The same as the partition wall | 40 | 12 | 5 |
| Comp. Ex. 4 | Hybrid wall | 152.4 | 143.8 | 0.305 | 35 | 12 | 46.5 | The same as the partition wall | 35 | 12 | 5 |
| Ex. 4 | Hybrid protrusion | 152.4 | 143.8 | 0.305 | 48 | 12 | 46.5 | The same as the partition wall | 48 | 12 | 5 |
| Ex. 5 | Hybrid wall | 152.4 | 143.8 | 0.305 | 48 | 12 | 46.5 | The same as the partition wall | 48 | 12 | 10 |
| Ex. 6 | Hybrid wall | 152.4 | 143.8 | 0.305 | 48 | 12 | 46.5 | The same as the partition wall | 48 | 12 | 20 |
| Ex. 7 | Hybrid wall | 152.4 | 143.8 | 0.305 | 48 | 12 | 46.5 | The same as the partition wall | 48 | 12 | 40 |
| Comp. Ex. 5 | Hybrid wall | 152.4 | 143.8 | 0.305 | 48 | 12 | 46.5 | The same as the partition wall | 48 | 12 | 50 |
| Comp. Ex. 6 | Hybrid wall | 152.4 | 143.8 | 0.305 | 48 | 12 | 46.5 | 20% of the partition wall | 48 | 12 | 5 |
| Ex. 8 | Hybrid wall | 152.4 | 143.8 | 0.305 | 48 | 12 | 46.5 | 30% of the partition wall | 48 | 12 | 5 |
| Ex. 9 | Hybrid wall | 152.4 | 143.8 | 0.305 | 48 | 12 | 46.5 | 40% of the partition wall | 48 | 12 | 5 |
| Ex. 10 | Hybrid wall | 152.4 | 143.8 | 0.305 | 48 | 12 | 46.5 | 120% of the partition wall | 48 | 12 | 5 |
| Ex. 11 | Hybrid wall | 152.4 | 143.8 | 0.305 | 48 | 12 | 46.5 | 140% of the partition wall | 48 | 12 | 5 |
| Comp. Ex. 7 | Hybrid wall | 152.4 | 143.8 | 0.305 | 48 | 12 | 46.5 | 150% of the partition wall | 48 | 12 | 5 |
| Ex. 12 | Hybrid wall | 152.4 | 143.8 | 0.305 | 58 | 26 | 46.5 | The same as the partition wall | 58 | 26 | 5 |

"Usual" in a "structure" column in Table 1 means a honeycomb catalyst body in which a catalyst is also loaded onto pore surfaces of partition walls and which does not have any projecting portions. "Hybrid wall" means that the honeycomb catalyst body has the projecting portions and that the projecting portions are partition walls further defining each cell to further define a plurality of cells (small cells). "Hybrid protrusion" means that the honeycomb catalyst body has the projecting portions and that the projecting portions are protrusion-like projecting portions projecting from the surfaces of the partition walls (see FIG. 5). "Usual cell density" means a cell density in a honeycomb catalyst body in which any projecting portions is not formed.

As to the prepared honeycomb catalyst body, respective evaluations of [Initial Pressure Loss], [PM Pressure Loss], [Isostatic Strength] and [Collecting Efficiency] were carried out. An evaluating method of each evaluation is as follows.

[Initial Pressure Loss]:

The initial pressure loss is a pressure loss measured in a state where particulate matters such as soot and ash are not deposited on partition walls of the honeycomb catalyst body. Specifically, air having a constant flow rate at 25° C. was allowed to flow into the honeycomb catalyst body at 10 Nm³/minute, and pressures in an inflow side end face and an outflow side end face of the honeycomb catalyst body were measured, to obtain a differential pressure between the pressures as the initial pressure loss. This initial pressure loss was evaluated in accordance with the following basis for evaluation. A case where the initial pressure loss is 4.7 MPa or more is "NG", and a case where the initial pressure loss is smaller than 4.7 MPa is "OK". "The initial pressure loss" is described in Table 2.

[PM Pressure Loss]:

The PM pressure loss is the pressure loss measured in a state where a gas including ash is passed through the honeycomb catalyst body and the ash (soot) is deposited on the surfaces of the partition walls of the honeycomb catalyst body. Specifically, air having a constant flow rate at 250° C. was allowed to flow into the honeycomb catalyst body at 185 kg/hour, and pressures in an inflow side end face and an outflow side end face of the honeycomb catalyst body were measured, to obtain a differential pressure between the pressures as the pressure loss. In this way, the PM pressure loss of the prepared honeycomb catalyst body was measured. The measured PM pressure loss was evaluated in accordance with the following basis for evaluation. A case where the PM pressure loss is 9.0 kPa or more is "NG", and a case where the PM pressure loss is smaller than 9.0 kPa is "OK". "The PM pressure loss" is described in Table 2.

[Isostatic Strength]:

The isostatic strength of the prepared honeycomb catalyst body was measured. The isostatic strength was measured on the basis of an isostatic breaking strength test stipulated in car standard (JASO standard) M505-87 issued by Society of Automotive Engineers of Japan. The isostatic breaking strength test is a test in which a honeycomb structure is disposed in a rubber columnar container and the container is closed with a lid of a plate made of aluminum, to carry out isotropic pressurizing compression in water. The isostatic breaking strength is indicated by an applied pressure value (MPa) when the honeycomb catalyst body breaks. It is to be noted that the isostatic breaking strength test is a test to simulate a compressive load application of the honeycomb catalyst body contained in a can member in a state where a peripheral surface of the honeycomb catalyst body is held, when the honeycomb catalyst body is mounted in a car. In Table 2, the present evaluation is described as "ISO".

The measured isostatic strength was evaluated in accordance with the following basis for evaluation. That is, a case where the isostatic strength is 0.7 MPa or less is "NG", and a case where the isostatic strength is in excess of 0.7 MPa is "OK".

[Collecting Efficiency]:

The collecting efficiency of the prepared honeycomb catalyst body was measured. Specifically, the honeycomb catalyst body was set to an artificial soot generating device, and supply conditions of the exhaust gas including the soot were set to a gas flow rate of 174 kg/hour and a gas temperature of 290° C. Next, a soot deposition speed was set to 2 g/hour, and concentrations of the soot in the gas on an inlet side (upstream) and an outlet side (downstream) of the honeycomb catalyst body were measured by a smoke meter. The collecting efficiency is a value at a deposited soot amount of 0.5 (g/honeycomb catalyst body). The collecting efficiency is calculated from the measured value of the smoke meter (the concentration of the soot) in terms of the following calculating equation. The calculated collecting efficiency was evaluated in accordance with the following evaluation standard. A case where the collecting efficiency is 95% or more is "OK", and a case where the collecting efficiency is smaller than 95% is "NG".

collecting efficiency(%)=100×{1−(the concentration of the soot in the downstream gas of the honeycomb catalyst body)/(the concentration of the soot in the upstream gas of the honeycomb catalyst body)}  Equation:

The results of the respective evaluations in the present example are shown in Table 2.

[Table 2]

TABLE 2

|  | Initial pressure loss | | PM pressure loss | | ISO | | Collecting efficiency | |
| --- | --- | --- | --- | --- | --- | --- | --- | --- |
|  | (kPa) | Evaluation | (kPa) | Evaluation | (MPa) | Evaluation | (%) | Evaluation |
| Comp. Ex. 1 | 4.7 | NG | 6.94 | OK | 2.95 | OK | 97.2 | OK |
| Comp. Ex. 2 | 9.09 | NG | 11.6 | NG | 10.9 | OK | 99.9 | OK |
| Comp. Ex. 3 | 3.14 | OK | 3.45 | OK | 0.68 | NG | 95.4 | OK |
| Ex. 1 | 3.16 | OK | 5.63 | OK | 1.27 | OK | 96.7 | OK |
| Ex. 2 | 3.45 | OK | 5.73 | OK | 8.67 | OK | 99.8 | OK |
| Ex. 3 | 4.06 | OK | 7.33 | OK | 13.7 | OK | 98.5 | OK |
| Comp. Ex. 4 | 5.12 | NG | 10.1 | NG | 17.4 | OK | 97.9 | OK |
| Ex. 4 | 3.07 | OK | 6.26 | OK | 7.37 | OK | 99.7 | OK |
| Ex. 5 | 3.75 | OK | 6.4 | OK | 8.9 | OK | 99.9 | OK |
| Ex. 6 | 4.05 | OK | 7.07 | OK | 9.1 | OK | 99.9 | OK |
| Ex. 7 | 4.65 | OK | 8.41 | OK | 9.57 | OK | 99.9 | OK |
| Comp. Ex. 5 | 4.96 | NG | 9.08 | NG | 9.8 | OK | 99.9 | OK |
| Comp. Ex. 6 | 2.46 | OK | 5.21 | OK | 0.45 | NG | 99.8 | OK |
| Ex. 8 | 2.53 | OK | 5.24 | OK | 0.72 | OK | 99.8 | OK |
| Ex. 9 | 2.62 | OK | 5.28 | OK | 3.26 | OK | 99.8 | OK |
| Ex. 10 | 3.95 | OK | 5.96 | OK | 9.41 | OK | 99.8 | OK |
| Ex. 11 | 4.66 | OK | 6.32 | OK | 10.1 | OK | 99.8 | OK |
| Comp. Ex. 7 | 5.13 | NG | 6.56 | OK | 10.5 | OK | 99.8 | OK |
| Ex. 12 | 3.13 | OK | 5.05 | OK | 1.2 | OK | 91.3 | NG |

Examples 2 to 12 and Comparative Examples 1 to 7

The respective honeycomb catalyst bodies of Examples 2 to 12 and Comparative Examples 1 to 7 are prepared in the same manner as Example 1 except that honeycomb catalyst bodies satisfying the conditions shown in Table 1 were prepared. Afterward, the respective prepared honeycomb catalyst bodies were evaluated in the same manner as in Example 1. The results are shown in Table 2.

As clear from Table 2, it was possible to confirm that the honeycomb catalyst bodies of Examples 1 to 12 had high mechanical strength, less pressure loss, and suitable purification performance. Specifically, the honeycomb catalyst bodies of Comparative Examples 1 to 7 were "NG" in any one of the evaluations of [Initial Pressure Loss], [PM Pressure Loss] and [Isostatic Strength], but the plugged honeycomb structures of Examples 1 to 12 were "OK" in any one of the evaluations of [Initial Pressure Loss], [PM Pressure Loss] and [Isostatic Strength]. Moreover, the honeycomb catalyst bodies of Examples 1 to 12 were "OK" in the evaluation of [Collecting Efficiency]. Specifically, it was possible to confirm that the honeycomb catalyst bodies of Examples 1 to 12 were capable of suitably collecting a particulate matter such as soot.

A honeycomb catalyst body of the present invention can suitably be used in purification of an exhaust gas.

DESCRIPTION OF REFERENCE SIGNS

2: inflow side end face, 3: outflow side end face, 4: cell, 4a: inflow cell, 4b: outflow cell, 5: partition wall, 6: small cell, 7: peripheral wall, 8: plugged portion, 8a: inflow side plugged portion, 8b: outflow side plugged portion, 9 and 19: projecting portion, 9a and 19a: inflow cell side projecting portion, 9b and 19b: outflow cell side projecting portion, 10: plugged honeycomb structure, and 100 and 101: honeycomb catalyst body.

What is claimed is:

1. A honeycomb catalyst body comprising:
   a plugged honeycomb structure having porous partition walls defining a plurality of cells extending from an inflow side end face to an outflow side end face and to become through channels of a fluid, inflow side plugged portions provided at outflow side ends of the predetermined cells, outflow side plugged portions provided at inflow side ends of the remaining cells, and porous projecting portions projecting so as to extend from the partition walls into the cells and being formed integrally with the partition walls; and
   a catalyst loaded onto the projecting portions of the plugged honeycomb structure,
   wherein a porosity of each of the partition walls of the plugged honeycomb structure is 40% or more and smaller than 60%,
   a thickness of each of the projecting portions is from 30 to 140% of a thickness of each of the partition walls,
   an amount of the catalyst loaded onto the partition walls in a cross section perpendicular to an extending direction of the cells is 40% or less of a total amount of the catalyst loaded onto the plugged honeycomb structure, and
   an amount of the catalyst to be loaded onto the partition walls is smaller than an amount of the catalyst to be loaded onto the projecting portions.

2. The honeycomb catalyst body according to claim 1, wherein the amount of the catalyst loaded onto the partition walls of the plugged honeycomb structure is 5% or less of the total amount of the catalyst loaded onto the plugged honeycomb structure.

3. The honeycomb catalyst body according to claim 2, wherein each of the projecting portions of the plugged honeycomb structure is in the form of a wall defining the cell to form a plurality of cells.

4. The honeycomb catalyst body according to claim 2, wherein each of the projecting portions of the plugged honeycomb structure is in the form of a protrusion projecting from the surface of the partition wall.

5. The honeycomb catalyst body according to claim 1, wherein an average pore diameter of the partition walls of the plugged honeycomb structure is 25 µm or less.

6. The honeycomb catalyst body according to claim 5, wherein each of the projecting portions of the plugged honeycomb structure is in the form of a wall defining the cell to form a plurality of cells.

7. The honeycomb catalyst body according to claim 5, wherein each of the projecting portions of the plugged honeycomb structure is in the form of a protrusion projecting from the surface of the partition wall.

8. The honeycomb catalyst body according to claim 1, wherein each of the projecting portions of the plugged honeycomb structure is in the form of a wall defining the cell to form a plurality of cells.

9. The honeycomb catalyst body according to claim 1, wherein each of the projecting portions of the plugged honeycomb structure is in the form of a protrusion projecting from the surface of the partition wall.

10. The honeycomb catalyst body according to claim 1, wherein the projecting portions of the plugged honeycomb structure project so as to extend into inflow cells being the cells provided with the outflow side plugged portions and into outflow cells being the cells provided with the inflow side plugged portions, and
the catalyst loaded onto the projecting portions extending into the inflow cells of the plugged honeycomb structure is of a type different from that of the catalyst loaded onto the projecting portions extending into the outflow cells of the plugged honeycomb structure.

11. The honeycomb catalyst body according to claim 1, wherein the thickness of each of the partition walls of the plugged honeycomb structure is from 64 to 508 µm.

* * * * *